United States Patent
Navarro (10) Patent No.: US 11,271,407 B2
(45) Date of Patent: Mar. 8, 2022

(54) POWER DISTRIBUTION SYSTEM USING AC/DC RING CONFIGURATION

(71) Applicant: Eaton Intelligent Power Limited, Dublin (IE)

(72) Inventor: George Arthur Navarro, Raleigh, NC (US)

(73) Assignee: Eaton Intelligent Power Limited, Dublin (IE)

( * ) Notice: Subject to any disclaimer, the term of this patent is extended or adjusted under 35 U.S.C. 154(b) by 278 days.

(21) Appl. No.: 15/092,995

(22) Filed: Apr. 7, 2016

(65) Prior Publication Data
US 2017/0294782 A1    Oct. 12, 2017

(51) Int. Cl.
*H02J 5/00*    (2016.01)
*H02J 3/02*    (2006.01)
*H02J 9/06*    (2006.01)
*H02M 3/04*    (2006.01)
*H02M 7/68*    (2006.01)

(52) U.S. Cl.
CPC    *H02J 5/00* (2013.01); *H02J 3/02* (2013.01); *H02J 9/061* (2013.01); *H02M 3/04* (2013.01); *H02M 7/68* (2013.01); *Y02P 90/40* (2015.11)

(58) Field of Classification Search
CPC .. H02J 5/00; H02J 9/061; H02M 3/04; H02M 7/68
USPC .......................................................... 307/26
See application file for complete search history.

(56) References Cited

U.S. PATENT DOCUMENTS

| 8,447,435 B1* | 5/2013 | Miller ....................... G05F 1/66 |
|---|---|---|
| | | 700/297 |
| 2005/0200337 A1* | 9/2005 | Schreiber ................ H02J 3/381 |
| | | 323/205 |
| 2008/0103630 A1* | 5/2008 | Eckroad .................... H02J 3/02 |
| | | 700/286 |

(Continued)

FOREIGN PATENT DOCUMENTS

| CN | 101919135 A | 12/2010 |
|---|---|---|
| CN | 104704706 A | 6/2015 |

(Continued)

OTHER PUBLICATIONS

Notification of Transmittal of the International Search Report and the Written Opinion of the International Searching Authority, or the Declaration, PCT/US2017/025830, dated May 23, 2017, 10 pages.

(Continued)

*Primary Examiner* — Hal Kaplan
*Assistant Examiner* — Swarna N Chowdhuri
(74) *Attorney, Agent, or Firm* — Stanek Lemon Crouse & Meeks, P.A.

(57) ABSTRACT

A power distribution system includes at least two DC buses and at least two AC buses and a plurality of converter units interconnecting the DC buses and the AC buses in a ring. The system may further include one or more AC power sources (e.g., utility feeds, engine-generator sets, etc.) connected to selected ones of the AC buses and/or one or more DC power sources (batteries, capacitor banks, fuel cells, etc.) connected to selected ones of the DC buses. The ring configuration can support a variety of AC and DC loads and provide redundancy and power distribution among the power sources.

11 Claims, 6 Drawing Sheets

(56) References Cited

U.S. PATENT DOCUMENTS

| | | | | |
|---|---|---|---|---|
| 2010/0292853 | A1* | 11/2010 | McDonnell | H02J 3/34 |
| | | | | 700/287 |
| 2011/0106325 | A1* | 5/2011 | Opina, Jr. | H02J 3/381 |
| | | | | 700/287 |
| 2012/0007424 | A1* | 1/2012 | Maier | H02J 3/0073 |
| | | | | 307/18 |
| 2014/0097680 | A1 | 4/2014 | Navarro | |
| 2017/0373502 | A1* | 12/2017 | Gjerpe | H02J 3/38 |

FOREIGN PATENT DOCUMENTS

| | | |
|---|---|---|
| DE | 10 2004 003657 A1 | 8/2005 |
| EP | 1 919 054 A2 | 7/2007 |
| WO | WO 2014/155540 A1 | 10/2014 |

OTHER PUBLICATIONS

First Office Action for Chinese Appl. No. 201780029563.5, dated Nov. 1, 2021, 22 pages.

\* cited by examiner

POWER DISTRIBUTION SYSTEM USING AC/DC RING CONFIGURATION

BACKGROUND

The inventive subject matter relates to power distribution systems and methods and, more particularly, to mixed AC/DC power distribution systems.

Power distribution systems for electronic and electromechanical equipment in industrial facilities, data centers and other applications commonly use AC power distribution networks in which utility power is distributed via power distribution units (PDUs) to branch circuits, which, in turn, provide power to loads such as server racks, HVAC equipment, and the like. Continuous power may be provided by incorporating local diesel or natural gas powered engine-generator sets and uninterruptible power supply (UPS) systems that provide backup power from batteries, capacitor banks, fuel cells and similar devices. Some power distribution systems may also support provision of power from alternative energy sources, such as photovoltaic (PV) arrays. Such auxiliary and alternative power sources may require the use of inverters to interface to the AC power distribution system.

Some data centers may use DC power distribution systems that have a similar topology. AC power may be provided to a plurality of rectifiers, which produce a DC output that may be distributed to loads via PDUs. Batteries and other DC power sources may be coupled directly to the DC distribution network, or interfaced thereto using DC/DC converters.

SUMMARY

Some embodiments of the inventive subject matter provide a power distribution system including at least two DC buses and at least two AC buses and a plurality of converter units interconnecting the DC buses and the AC buses in a ring. The system may further include an AC power source connected to a first one of the AC buses, an AC load connected to a second one of the AC buses, and a DC load connected to a first one of the DC buses. The AC power source may include first AC power source, and the system may further include a second AC power source connected to a third one of the AC buses. In some embodiments, the first and second AC power sources may include respective first and second utility feeds. In some embodiments, the first AC power source may include a utility feed and the second AC power source may include an engine/generator set. The system may further include at least one DC power source connected to a second one of the DC buses. The system may further include a controller configured to control the converter units to selectively provide power to the AC load and the DC load from the first and second AC power sources.

In some embodiments, at least one of the converter units comprises at least one switch (e.g., a static switch) configured to couple and decouple an AC power source to and from one of the AC buses. The at least one switch may include first and second switches configured to couple and decouple respective first and second AC power sources to and from the one of the AC buses. The at least one of the converter units may further include a DC/DC converter circuit configured to couple a DC power source to one of the DC buses.

Further embodiments of the inventive subject matter provide a power distribution system including at least two DC buses and at least two AC buses and a plurality of converter units interconnecting the DC buses and the AC buses in a ring comprising at least one of the DC buses disposed between two of the at least two AC buses. The system further includes first and second AC power sources connected to the ring, at least one AC load connected to at least one of the AC buses, and at least one DC load connected to at least one of the DC buses. A controller is configured to control the converter units to selectively provide power to the at least one AC load and the at least one DC load from the first and second AC power sources. In some embodiments, the first AC power source may include a first utility feed connected to a first one of the AC buses and the second AC power source may include a second utility feed connected to a second one of the AC buses. In further embodiments, the first AC power source may include a utility feed connected to a first one of the AC buses and the second AC power source may include an engine/generator set connected to a second one of the AC busses. The system may further include at least one DC power source coupled to at least one of the DC buses. In some embodiments, at least one of the converter units may include first and second switches configured to couple and decouple the respective ones of the first and second AC power sources to and from respective second and third ones of the AC buses.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise.

It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 1:
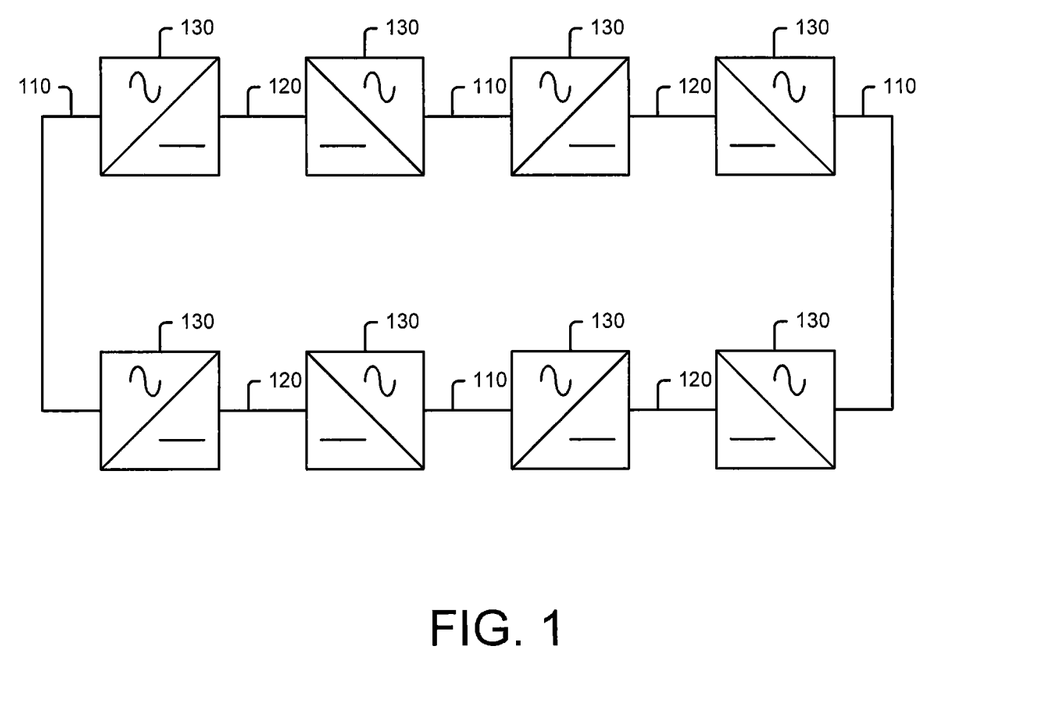
FIG. 1 is a schematic diagram illustrating a power distribution system with an AC/DC ring structure according to some embodiments.

FIG. 1 illustrates a system 100 according to some embodiments of the inventive subject matter. The system 100 includes a plurality of AC buses 110 and DC buses 120 interconnected to form a ring by bidirectional converter circuits 130. The converter circuits 130 are configured to support power flows between adjacent ones of the AC buses 110 and DC buses 120. The ring includes at least two AC buses and at least two DC buses, with at least one DC bus coupled between two AC buses. As explained below, AC/DC ring power distribution systems according to various embodiments of the inventive subject matter may include a variety of different arrangements of AC buses, DC buses and interconnecting converters. It will be appreciated that the converters 130 may be implemented using any of a variety of different analog and digital circuitry. For example, the converters 130 may be bridge-type power converters controlled by microcontrollers or similar data processing devices. It will be appreciated that the AC buses 110 may be single or multi-phase and that the AC buses 110 and DC buses may operate at various different voltage levels.

Figure 2:
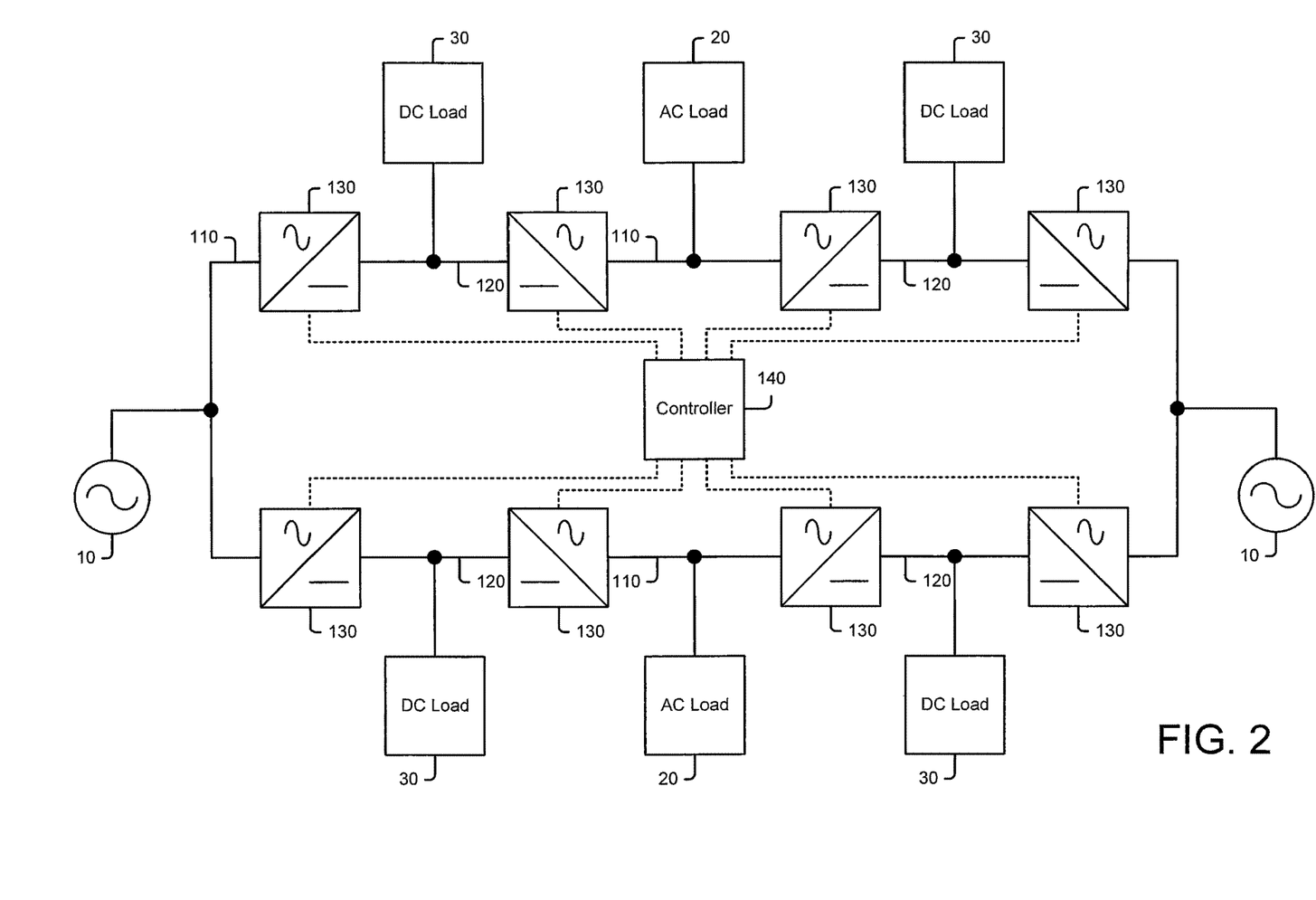
FIG. 2 is a schematic diagram illustrating interfacing of power sources and loads with the system of FIG. 1 according to some embodiments.

Referring to FIG. 2, in some embodiments, a ring configuration such as the one shown FIG. 1 may support flexible connection of AC power sources 10, AC loads 20 and DC loads 30 to the ring. This flexibility may be particularly advantageous, for example, in some data centers or other installations that include a mix of AC and DC powered equipment. Such an arrangement may also be used to provide power distribution at various different AC and DC voltage levels and various different AC voltage frequencies and phases.

Such a ring configuration can also provide flexible load allocation and redundancy by providing alternate pathways by which power may be transferred from the AC power source 10 to the AC loads 20 and DC loads 30. For example, under certain conditions, the AC power sources 10 may be used to provide power to separate portions of the ring, e.g., the converters 130 may be operated such that power is delivered from a first one of the sources 10 to AC loads 20 and DC loads 30 attached to AC buses 110 and DC buses 120 of a first portion of the ring and from a second one of the AC power sources 10 to AC loads 20 and DC loads 30 connected to AC buses 110 and DC buses 120 of a second portion of the ring. If one of the AC power sources 10 fails, operations of the converters 130 may be modified to redistribute the AC loads 20 and the DC loads 30 so that the remaining one of the AC power sources 10 supplies power to the AC loads 20 and DC loads 30 formerly served by the failed AC power source 10. Allocation of the AC loads 20 and DC loads 30 to the power sources 10 may be based on power demands of the various loads, capabilities of the sources and capabilities of the buses and interconnecting converters. As shown, system-level control of the converters 130 may be implemented using a master controller 140 coupled to the converters 130 and/or system level control functions may be distributed across the set of converters 130 using, for example, peer-to-peer communications.

Figure 3:
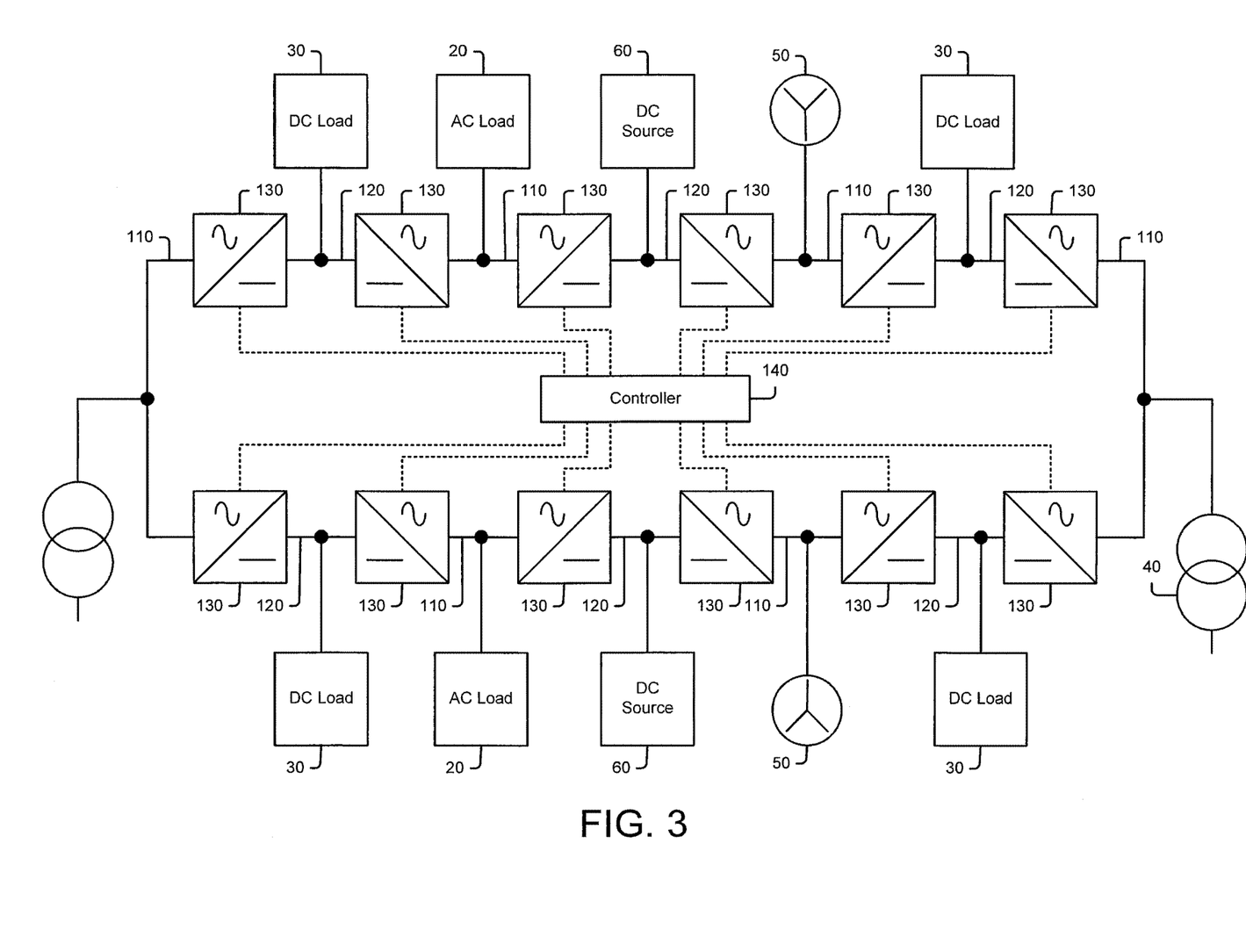
FIG. 3 is a schematic diagram illustrating interfacing of power sources and loads with a power distribution system according to some embodiments.

It will be appreciated that AC-DC ring architectures along the lines described above may be varied to support any of a variety of different combinations of sources and loads. For example, referring to FIG. 3, a system 300 may include utility sources 40 coupled to selected AC buses 110, generators (e.g., engine-generator sets) 50 coupled to other AC buses 110 and DC power sources 60 (e.g., batteries, supercapacitor banks, fuel cells, photovoltaic sources, etc.) coupled to selected DC buses 120. A controller 140 coupled to the converters 130 and/or integrated therein may control power flows through the converters 130 to allow optimized use of the various power sources and redundant backup in case of the failure of one or more of the power sources.

Figure 4:
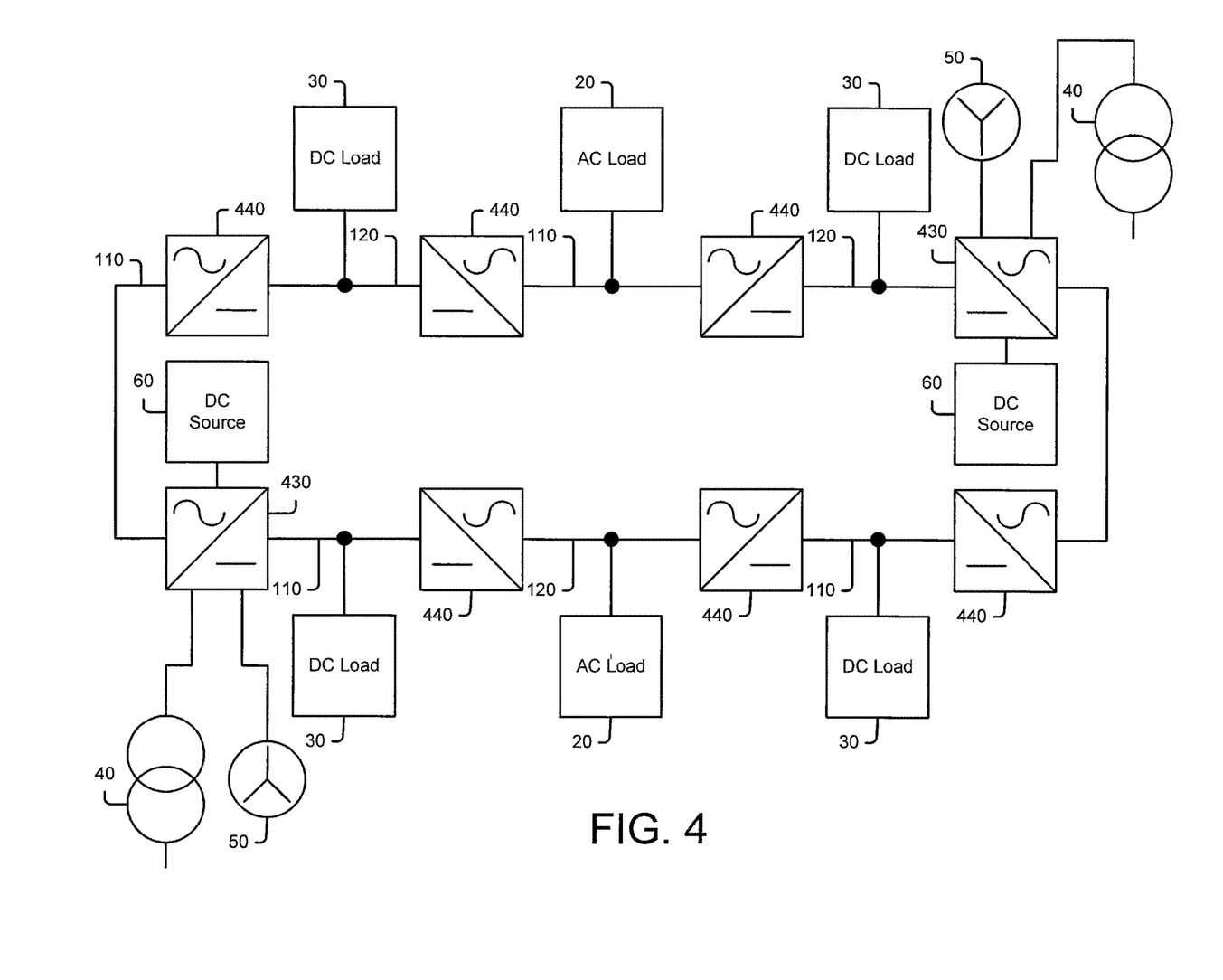
FIG. 4 is a schematic diagram illustrating a power distribution system with an AC/DC ring configuration according to further embodiments.

FIG. 4 illustrates a system 400 with an AC/DC ring bus arrangement according to further embodiments which utilizes at least one converter unit 430 that is configured to be coupled to multiple AC power sources, here shown as a utility source 40 and a generator 50, and a DC power source 60, such as a battery or capacitor bank. Each converter unit 430 may be configured to selectively provide power to AC buses 110 and DC buses 120 of the ring from the AC power sources 40, 50 and the DC power source 50. Additional converter units 440 may be used to link other AC buses 110 and DC buses 120. For purposes of clarity, control circuitry for coordinating operations of the converter units 430, 440 is not shown, but it will be appreciated that such circuitry may be implemented in one or more units external to the converter units 430, 440 and/or distributed therein, as explained above with reference to FIG. 2.

Figure 5:
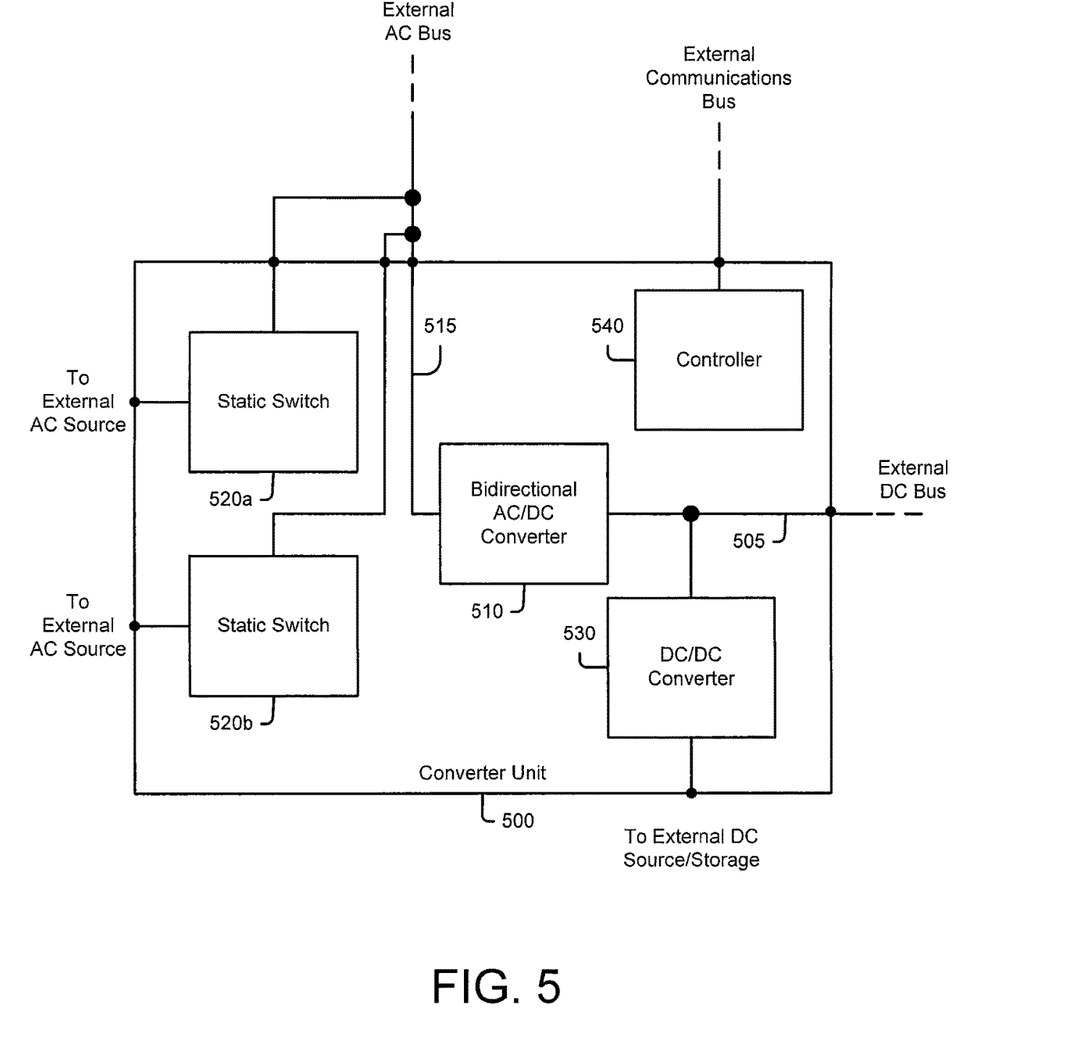
FIG. 5 is a schematic diagram illustrating a converter unit of the system of FIG. 4 according to some embodiments.

FIG. 5 illustrates an exemplary architecture of a converter unit 500 having a configuration that may be used for the converters 430. The converter unit 500 provides a combination of an uninterruptible power supply (UPS) functionality combined with first and second static switches 520a, 520b (e.g., antiparallel-connected silicon controlled rectifiers (SCRs)) configurable to provide a transfer switch functionality, i.e., to selectively couple respective external AC power sources, such as two different utility sources, a utility source and a generator, two generators, etc., to an internal AC bus 515. The internal AC bus 515 is configured to be coupled to an external AC bus, such as one of the AC buses 110 of FIG. 4. An AC/DC converter circuit 510 has a first port coupled to the internal AC bus 515 and a second port coupled to an internal DC bus 505, which may be configured to be coupled to an external DC bus, such as one of the DC buses 120 of FIG. 4. The unit 500 may further include a DC/DC converter circuit 530 having a first port coupled to the internal DC bus 505 and a second port configured to be coupled to an external DC power source/storage, such as a battery, capacitor bank, photovoltaic array, etc. A controller 540 controls the static switches 520a, 520b, the AC/DC converter circuit 510 and the DC/DC converter circuit 530, and may be configured to communicate with an external controller, such as a master controller or a controller of another converter unit. Apparatus combining UPS functionality with multiple static switches are described in U.S. Patent Application Publication No. 2014/0097680 to Navarro, corresponding to U.S. patent application Ser. No. 13/644,936, filed Oct. 4, 2012, assigned to the assignee of the present application and incorporated herein by reference.

Referring again to FIG. 4, it will be appreciated that the converter units 440 need not have the configuration illustrated in FIG. 5. For example, the converter units 440 not include static switches and/or DC/DC converter circuitry as shown in FIG. 5. In some embodiments, the converters 440 may utilize different structures than the converters 430 that are coupled to the AC power sources and the DC power sources. However, in some embodiments, the converters 440 and the converters 430 may use a common architecture that supports provision of a converter unit such as the converter unit 500 of FIG. 5, but the converter units 440 that are not coupled to power sources may be depopulated of static switch components, DC/DC converter components and other hardware in the interest of reduced cost and/or complexity. Such depopulated converter units may be upgraded to include such circuitry as needed to support flexible reconfiguration of a power distribution system.

Figure 6:
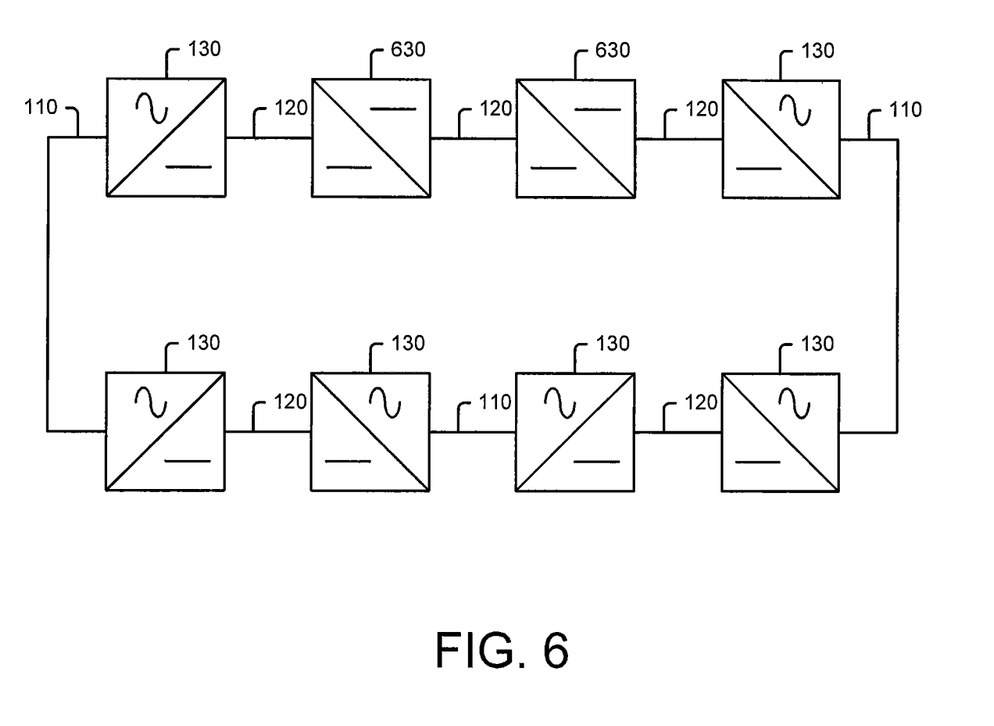
FIG. 6 is a schematic diagram illustrating a power distribution system with an AC/DC ring structure according to further embodiments.

It will be appreciated that other embodiments may use ring configurations other than those shown above. For example, FIG. 6 illustrates a ring configuration including AC/DC converters 130 that link AC buses 110 to DC buses 120, along with DC/DC converters 430 that interconnect selected ones of the DC buses 120. Such as arrangement may be used, for example, to provide DC buses with different voltage levels. Other embodiments may use configurations including AC/AC converters to link AC buses together.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A power distribution system comprising:
    at least two DC buses and at least two AC buses;
    a plurality of converter units interconnecting the DC buses and the AC buses in a closed ring that includes the at least two DC buses and the at least two AC buses, wherein each of the at least two AC buses electrically interconnects two of the converter units, and wherein at least one of the converter units comprises a converter circuit coupled to one of the AC buses and separate first and second switches configured to directly couple and decouple a utility feed and an engine/generator set, respectively, to and from the one of the AC buses;
    an AC load connected to a second one of the AC buses; and
    a DC load connected to a first one of the DC buses.

2. The system of claim 1, further comprising at least one DC power source connected to a second one of the DC buses.

3. The system of claim 1, further comprising a controller configured to control the converter units to selectively provide power to the AC load and the DC load from the utility feed and the engine/generator set.

4. The system of claim 3, further comprising at least one DC power source connected to at least one of the DC buses.

5. The system of claim 4, wherein the controller is further configured to control the converter units to selectively provide power to the AC load and the DC load from the at least one DC power source.

6. The system of claim 1, wherein at least one of the converter units comprises at least one switch configured to couple and decouple an AC power source to and from one of the AC buses.

7. The system of claim 6, wherein the at least one switch comprises first and second switches configured to couple and decouple respective first and second AC power sources to and from the one of the AC buses.

8. The system of claim 1, further comprising a DC/DC converter circuit external to the ring and configured to couple a DC power source to one of the DC buses.

9. A power distribution system comprising:
    a closed power distribution ring comprising at least four DC buses interconnected with at least two AC buses by at least four AC/DC converter units interconnecting the DC buses and the AC buses such that each AC bus of the power distribution ring electrically interconnects two of the converter units, wherein the ring further comprises at least one DC/DC converter unit that interconnects two of the DC buses; and
    an AC power source connected to a first one of the AC buses.

10. The system of claim 9, further comprising an AC load connected to a second one of the AC buses.

11. The system of claim 9, further comprising a DC load connected to a first one of the DC buses.

* * * * *